United States Patent
Hu et al.

(10) Patent No.: US 7,953,751 B2
(45) Date of Patent: *May 31, 2011

(54) SYSTEM AND METHOD FOR AUDIO HOT SPOTTING

(75) Inventors: Qian Hu, Lexington, MA (US); Fred J. Goodman, Montgomery Village, MD (US); Stanley M. Boykin, Stoughton, MA (US); Randall K. Fish, Dillsburg, PA (US); Warren R. Greiff, Chelmsford, MA (US)

(73) Assignee: The Mitre Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/577,242

(22) Filed: Oct. 12, 2009

(65) Prior Publication Data

US 2010/0076996 A1    Mar. 25, 2010

Related U.S. Application Data

(63) Continuation of application No. 11/087,703, filed on Mar. 24, 2005, now Pat. No. 7,617,188.

(51) Int. Cl.
*G06F 17/30* (2006.01)
(52) U.S. Cl. ............... 707/769; 707/913; 707/E17.009
(58) Field of Classification Search ........... 707/802, 707/769, 913, 999.107
See application file for complete search history.

(56) References Cited

U.S. PATENT DOCUMENTS

| | | | |
|---|---|---|---|
| 5,794,249 A | 8/1998 | Orsolini et al. | |
| 6,029,124 A | 2/2000 | Gillick et al. | |
| 6,172,675 B1 | 1/2001 | Ahmad et al. | |
| 6,173,260 B1 | 1/2001 | Slaney | |
| 6,421,645 B1 | 7/2002 | Beigi et al. | |
| 6,507,838 B1 | 1/2003 | Syeda-Mahmood | |
| 6,535,849 B1 | 3/2003 | Pakhomov et al. | |
| 6,542,869 B1 | 4/2003 | Foote | |
| 6,567,775 B1 | 5/2003 | Maali et al. | |
| 6,578,040 B1 | 6/2003 | Syeda-Mahmood | |
| 7,031,921 B2 * | 4/2006 | Pitman et al. | 704/270.1 |
| 7,617,188 B2 * | 11/2009 | Hu et al. | 1/1 |
| 2001/0044719 A1 | 11/2001 | Casey | |
| 2002/0028021 A1 | 3/2002 | Foote et al. | |
| 2002/0080165 A1 | 6/2002 | Wakefield | |
| 2002/0080286 A1 | 6/2002 | Dagtas et al. | |
| 2002/0110248 A1 * | 8/2002 | Kovales et al. | 381/56 |
| 2003/0001881 A1 * | 1/2003 | Mannheimer et al. | 345/728 |
| 2003/0028384 A1 | 2/2003 | Kemp et al. | |

OTHER PUBLICATIONS

Cai, R. et al., "Highlight Sound Effects Detection in Audio Stream," *Proc. IEEE International Conference on Multimedia and Expo 2003 (ICME 03)* 3:37-40, Institute of Electrical and Electronics Engineers (2003).

(Continued)

*Primary Examiner* — Cheryl Lewis
(74) *Attorney, Agent, or Firm* — Sterne Kessler Goldstein & Fox PLLC

(57) ABSTRACT

Audio hot spotting is accomplished by specifying query criterion to include a non-lexical audio cue. The non-lexical audio cue can be, e.g., speech rate, laughter, applause, vocal effort, speaker change or any combination thereof. The query criterion is retrieved from an audio portion of a file. A segment of the file containing the query criterion can be provided to a user. The duration of the provided segment can be specified by the user along with the files to be searched. A list of detections of the query criterion within the file can also be provided to the user. Searches can be refined by the query criterion additionally including a lexical audio-cue. A keyword index of topic terms contained in the file can also be provided to the user.

32 Claims, 5 Drawing Sheets

OTHER PUBLICATIONS

Cardillo, P.S. et al., "Phonetic Searching vs LVCSR: How to Find What You Really Want in Audio Archives," *Int. J. Speech Technol.* 5:9-22, Kluwer Academic Publishers (2002).

Garofolo, J.S. et al., "The TREC Spoken Document Retrieval Track: A Success Story," *NIST Special Publication 500-246: The Eighth Text Retrieval Conference (TREC 8)*, Gaithersburg, MD, Nov. 17-19, 1999.

Hakkani-Tür, D. et al., "Combining Words and Prosody for Information Extraction from Speech," *Proc. Eurospeech '99*, 5:1991-1994, ISCA (1999).

Hansen, J.H.L. and Bou-Ghazale, S.E., "Getting Started with SUSAS: A Speech Under Simulated and Actual Stress Database," *Proc. Eurospeech '97* 4:1743-1746, ISCA (1997).

Hirschberg, J. et al., "Finding Information in Audio: A New Paradigm for Audio Browsing/Retrieval," *The ESCA ETRW Workshop, Accessing Information in Spoken Audio*, Cambridge, England, Apr. 19-20, 1999.

Johnson, S.E. et al., "Spoken Document Retrieval for TREC-9 at Cambridge University," *NIST Special Publication 500-249: The Ninth Text Retrieval Conference (TREC 9)*, Gaithersburg, MD, Nov. 13-16, 2000.

Kubala, F. et al., "Integrated Technologies for Indexing Spoken Language," *Commun. ACM*, 43:48-56, Association for Computing Machinery (2000).

Makhoul, J. et al., "Speech and Language Technologies for Audio Indexing and Retrieval," *Proc. IEEE*, 88:1338-1353, Institute of Electrical and Electronics Engineers (2000).

Mirghafori, N. et al., "Towards Robustness to Fast Speech in ASR," *Proc. 1996 ICASSP*, pp. 335-338, Institute of Electrical and Electronics Engineers (1996).

Morgan, N. and Fosler-Lussier, E., "Combining Multiple Estimators of Speaking Rate," *Proc. 1998 ICASSP* 2:729-732, Institute of Electrical and Electronics Engineers (1998).

Necioğlu, B.F. et al., "Objectively Measured Descriptors Applied to Speaker Characterization," *Proc. 1996 ICASSP '96*, pp. 483-486, Institute of Electrical and Electronics Engineers (1996).

Pinquier, J. et al., "Audio Classification by Search of Primary Components," *Proc. MIVARM'2004*, Sherbrooke, Canada, Oct. 25-26, 2004.

Plumpe, M.D. et al., "Modeling of the Glottal Flow Derivative Waveform with Application to Speaker Identification," *IEEE Trans. Speech Audio Processing* 7:569-586, Institute of Electrical and Electronics Engineers (1999).

Renals, S. and Abberley, D., "The THISL SDR System at TREC-9," *NIST Special Publication 500-249: The Ninth Text Retrieval Conference (TREC 9)*, Gaithersburg, MD, Nov. 13-16, 2000.

Reynolds, D.A., "Speaker identification and verification using gaussian mixture speaker models," *Speech Commun.* 17:91-108, Elsevier (1995).

Stevens, K.N. and Hanson, H.M., "Classification of Glottal Vibration from Acoustic Measurements," in *Vocal Fold Physiology, Voice Quality Control*, Fujimura, O. and Hirano, M., eds., Singular Publishing Group, San Diego, CA, pp. 147-170 (1995).

Zheng, J. et al., "Word-Level Rate of Speech Modeling Using Rate-Specific Phones and Pronunciations," *Proc. 2000 ICASSP* 3:1775-1778, Institute of Electrical and Electronics Engineers (2000).

ScanSoft AudioMining Development System, printed on Jun. 27, 2005 from http://www.scansoft.com/audiomining/captioning/.

Nexidia NEXminer, printed on Jun. 27, 2005 from http://www.nexidia.com/product.asp.

BBN Audio Indexer, printed on Jun. 27, 2005 from http://www.bbn.com/For_Government_Customers/Data_Indexing_and_Mining/Audio_Indexer.html.

Virage's Audio/Video Logger, printed on Jun. 27, 2005 from http://www.virage.com.

Muscle Fish, printed on Jun. 27, 2005 from http://www.musclefish.com/.

HP's SpeechBot, printed on Jun. 27, 2005 from http://speechbot.research.compaq.com/.

Google Video Search printed on Jun. 27, 2005 from http://video.google.com.

Blinkx TV Video Search, printed on Jun. 27, 2005 from http://www.blinkxtv.com/.

Brill, E., "Some Advances in Transformation-Based Part of Speech Tagging," *Proceedings of the Twelfth National Conference on Artificial Intelligence* (vol. 1), American Association for Artificial Intelligence, Seattle, WA, 722-727 (1994).

Green, T., "Audio Hot Spotting: Finding a Needle in a Haystack of Digital Sound," *The MITRE Digest*, The MITRE Corporation, Feb. 2003.

Hu, "Audio Hot Spotting," *MITRE 2002 Technology Symposium*, Bedford, MA, May 2, 2002.

Hu, "Audio Hot Spotting," *The MITRE 10$^{th}$ Annual Technology Symposium*, McLean, VA, Apr. 9, 2003.

Brill, E., "Some Advances in Transformation-Based Part of Speech Tagging," *Proceedings of the Twelfth National Conference on Artificial Intelligence* (vol. 1), American Association for Artificial Intelligence, Seattle, WA, 722-727 (1994).

Green, T., "Audio Hot Spotting: Finding a Needle in a Haystack of Digital Sound," *The MITRE Digest*, The MITRE Corporation, Feb. 2003.

Hu, "Audio Hot Spotting," *MITRE 2002 Technology Symposium*, Bedford, MA, May 2, 2002.

Hu, "Audio Hot Spotting," *The MITRE 10$^{th}$ Annual Technology Symposium*, McLean, VA, Apr. 9, 2003.

Hu, "Audio Hot Spotting," *The MITRE 11$^{th}$ Annual Technology Symposium*, McLean, VA, Apr. 28, 2004.

Hu, et al., "The MITRE Audio Hot Spotting Prototype—Using Multiple Speech and Natural Language Processing Technologies," *Fifth International Conference on Text, Speech, and Dialog*, Brno, Czech Republic, Sep. 9-12, 2002.

Hu, et al., "Multimedia Indexing and Retrieval Technologies Using the Audio Track," *2002 IEEE Fall Conference for Technologies on Homeland Security*, Boston, MA, Nov. 13-14, 2002.

Hu, et al., "Information Discovery by Automatic Detection, Indexing, and Retrieval of Multiple Attributes from Multimedia Data," *3$^{rd}$ International Workshop on Multimedia Data and Document Engineering*, Berlin, Germany, Sep. 8, 2003.

Hu, et al., "Audio Hot Spotting and Retrieval Using Multiple Features,"*HLT-NAACL 2004 Workshop: Interdisciplinary Approaches to Speech Indexing and Retrieval*, Boston, MA, Apr. 19, 2004.

Hu, et al., "Audio Hot Spotting and Retrieval Using Multiple Audio Features and Multiple ASR Engines," *ICASSP 2004 Meeting Recognition Workshop sponsored by NIST*, Montreal, Canada, May 17, 2004.

* cited by examiner

SYSTEM AND METHOD FOR AUDIO HOT SPOTTING

CROSS REFERENCE TO RELATED APPLICATIONS

This application is a continuation of U.S. application Ser. No. 11/087,703, now U.S. Pat. No. 7,617,188, filed Mar. 24, 2005, which is herein incorporated by reference in its entirety.

BACKGROUND OF THE INVENTION

1. Field of the Invention

The present invention generally relates to speech technology application and audio information retrieval. More specifically, the present invention relates to the integration of multiple speech recognition technologies with audio-specific information retrieval algorithms for rapid multimedia indexing and retrieval.

2. Related Art

The ability to accurately detect and retrieve information from audio files is plagued by numerous problems. The desire to detect and retrieve information from multimedia files exacerbates these difficulties, since multimedia files containing audio information are not readily searchable by conventional text-based methods.

To search an audio file according to specified criteria to uncover relevant information, an analyst typically uses an automatic speech recognizer (ASR) to transcribe an audio file. The analyst then conducts a text-based keyword search of the ASR transcription output. This method enables the analyst to examine the contents of the audio file and search the audio file according to user-defined search parameters.

To ensure accurate speech detection and retrieval, ASRs and other speech search engines employ search algorithms that attempt to minimize false positives and false negatives. A false positive occurs when a specified search parameter is identified by a search engine as being present in an audio sample when, in fact, the specified search parameter is not present in the audio sample being analyzed. A false negative occurs when a specified search parameter is not identified by a search engine as being present in an audio sample when, in fact, the specified search parameter is present in the audio sample being analyzed. Essentially, a false positive is a detection when no detection should be made, and a false negative is no detection when a detection should be made.

False negatives and false positives are often caused by ASR transcription errors. Two significant causes of transcription errors are the variability of the acoustic channel and the presence of harsh noise conditions. Other contributing factors include speaker variance and the language model used by the ASR system. The result is a speech transcript which is often replete with deletion, substitution and insertion errors, thereby decreasing the reliability and usefulness of the ASR system.

Deletion errors occur when the speech transcript fails to report a word as spoken at a specified time in the audio file when, in fact, the word was spoken at the specified time. Insertion errors can occur when the speech transcription reports a word as spoken at a specified time in the audio file when, in fact, no word was spoken at the specified time. Alternatively, insertion errors can occur when multiple words are reported at a specified time when, in fact, a single word was spoken. Substitution errors occur when the speech transcription fails to properly recognize a word as spoken at a specified time in the audio file and consequently reports a different, and therefore incorrect, word as spoken at the specified time. Deletion errors in a speech transcript can prevent a user from finding what they are looking for within an audio file. Similarly, insertion and substitution errors can be misleading and confusing to an analyst who is attempting to gauge the contents, context, and importance of a reviewed audio file.

Current search and retrieval techniques do not offer relief from the enormous amounts of information the analyst must examine to uncover relevant information. With recent advances in storage technology, storing large amounts of multimedia files in various formats is no longer a problem. However, the critical bottleneck that has emerged for the analyst is the amount of time required to examine all of the stored information. The amount of time that the analyst can devote to any particular file is relatively finite. That is, the analyst simply does not have the time to listen to each audio file in its entirety, watch each multimedia file in its entirety, or read each transcription output in its entirety to determine whether or not they contain any relevant information. Current search and retrieval techniques fail to quickly and reliably direct the analyst to those particular audio segments that have a high probability of containing the items being sought.

An additional limitation of current search and retrieval techniques is the inability to provide an indication of an audio file's context. Merely identifying the presence of a keyword in an audio file is often insufficient. In the absence of context, such a "hit" is often not very useful because there are simply too many of them. Therefore, current search and retrieval techniques fail to identify and fully exploit non-lexical features of audio files that can be used to accurately provide the analyst with a quick understanding of the contents and context of an audio file. Non-lexical features such as background noises, manner of speaking, tension in the voice of the speaker, speaker identity and other parameters can permit the analyst to refine search techniques according to context or other prosodic cues to consequently shorten review time. Prosodic features generally relate either to the rhythmic aspect of language or to suprasegmental speech information sources, such as pitch, stress, juncture, nasalization and voicing.

Given the limitations of current search and retrieval techniques, a need exists for a system that leverages, enhances, and integrates multiple speech technologies with audio-specific information detection to provide rapid indexing and retrieval. That is, a system is needed to identify audio segments of interest based on multiple lexical and non-lexical user-specified parameters, to reduce examination time, provide enhanced information retrieval parameters, and to better meet real world search and retrieval applications.

SUMMARY OF THE INVENTION

Accordingly, the present invention is related to a system and method for audio hot spotting that substantially obviates one or more of the disadvantages of the related art.

In one aspect, there is provided a method of audio hot spotting that specifies a query criterion to include a non-lexical audio cue. The non-lexical audio cue can be, e.g., speech rate, laughter, applause, vocal effort (e.g., shouting or whispering), speaker change or any combination thereof. The query criterion is detected in an audio portion of a file. A segment of the file containing the query criterion can be provided to a user. The duration of the segment of the file containing the detected query criterion can be specified by the user, along with the files to be searched. A list of detections of the query criterion within the files can be provided to the user. The query criterion can also include a lexical audio cue, such as user-specified phoneme strings, a user-specified keyword, a user-specified keyphrase or any combination thereof. The lexical audio cue can be expanded phonetically, semantically, morphologically and/or translingually, and can be combined with the non-lexical audio cue to further refine searches. Further, a keyword index of potentially useful content words can be constructed from the various words transcribed by automatic speech recognition from the audio portion of the file.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

A proposed system leverages, enhances and integrates multiple speech technologies with audio-specific information detection to provide rapid indexing and retrieval. Specifically, the system allows an analyst to specify query criteria based on multiple lexical and non-lexical features of interest. The specified audio features of interest are then located within a set of multimedia files specified for analysis. The multiple audio segments of interest, each of which contains one or more detected audio features of interest, are then indexed and provided to the analyst. The analyst can then review the audio segments of interest to quickly dissect and examine the contents and context of selected multimedia files.

The system described herein also allows an analyst to examine the contents of a multimedia file according to user-defined audio features of interest. The defined features of interest can be lexical, non-lexical and/or prosodic audio features. The system also allows lexical queries to be expanded morphologically, phonetically, semantically and translingually. Further, the analyst can examine a set of multimedia files according to the combination of audio features of interest using Boolean operators. The system detects the presence of specified audio features of interests within the specified multimedia files and places a temporal pointer at their location in the multimedia file. The system allows the analyst to view a list of the occurrences of each detected audio feature of interest. A link can be provided to the segment of the multimedia file containing the audio feature of interest, so that the analyst can review only those portions of a multimedia file that contain detected audio features of interest.

Figure 1:
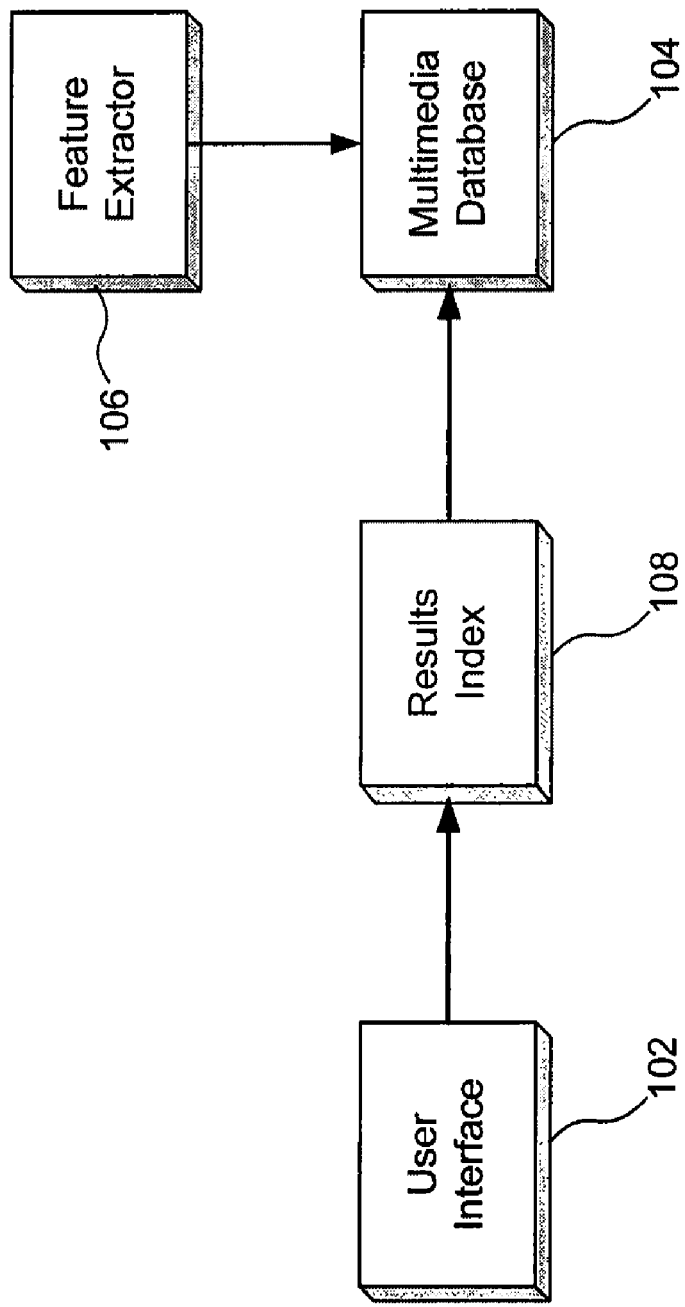
FIG. 1 illustrates a generalized embodiment of an audio hot spotting system.

FIG. 1 illustrates a generalized embodiment of an audio hot spotting system 100. A user interacts with the audio hot spotting system 100 at a user interface 102. The user interface 102 is used to specify multimedia files to analyze and to specify a type of query or analysis to conduct. The user interface 102 can be a Graphical User Interface (GUI) that provides the user with a list of available multimedia files and a list of available query capabilities. By specifying the type of query to conduct (query criterion or criteria), the user of the audio hot spotting system 100 can identify audio features of interest for detection within any specified multimedia file.

An audio feature of interest can be a lexical, non-lexical, prosodic or noise characteristic of an audio sample. Audio features of interest can therefore be, but are not limited to, keywords, keyphrases or phoneme strings. Audio features of interest can also be, e.g., speaker change, speaker identity, speech rate change, group laughter, group applause or vocal effort.

For definitional convenience, a non-lexical audio cue is considered to be speech rate, laughter, applause, vocal effort, speaker change or speaker identity. Further, a lexical audio cue can be, e.g., a user-specified phoneme string, a user-specified keyword or a user-specified keyphrase.

User interface 102 can be used to specify a search for audio features of interest across multiple multimedia files (cross-file search) and can broaden or narrow a search by date and time limitations. Further, the user interface 102 can include Boolean logic search requests based on selected audio features of interest.

The audio hot spotting system 100, as depicted in FIG. 1, also includes a multimedia database 104. The multimedia database 104 can include audio, video, and/or multimedia files such as Real Media, Waveform Sound (WAV), Audio Video Interleaved (AVI), Moving Picture Experts Group (MPEG) protocols, MPA (MPEG Audio only), Moving Picture Experts Group Layer 3 (MP3) and Moving Picture Experts Group Layer 4 (MP4). In addition to the physical media, multimedia database 104 can also contain preprocessed metadata obtained from processing the multimedia files through a feature extractor 106. Multimedia files contained in the multimedia database 104 and accessible to the audio hot spotting system 100 can be further pre-processed to achieve enhanced system performance. Such pre-processing can include acoustic model selection, training speech recognition language model with domain-specific vocabulary and documents, noise reduction or channel compensation.

Feature extractor 106 analyzes the specified multimedia files and inserts feature metadata from the files into multimedia database 104. This feature metadata can be searched for all the multimedia files through user interface 102. The feature metadata obtained from feature extractor 106 have temporal pointers to audio segments containing audio features of interest. The audio segments containing an audio feature of interest are "audio hot spots." To locate audio features of interest within a multimedia file, the user has the ability to search feature metadata from multimedia database 104 using user interface 102.

The output of the retrieval of audio hot spots from multimedia database 104 is a results index 108. The results index 108 provides a breakdown of audio hot spots categorized by type and location within the analyzed multimedia files. Specifically, the results index 108 provides the user with a listing of the occurrences of each audio feature of interest within each multimedia file specified by the query selection at the user interface 102. Further, the results index 108 provides the user with the audio hot spots uncovered by features extracted from the feature extractor 106. That is, the user can readily access the audio segments containing features of interest that are listed in the results index 108. The offset of the audio segments provided to the user can be configured in the audio hot spotting system 100. The duration of the audio segments provided to the user can be specified in the query criterion specified by feature extractor 106. By providing the audio segments of interest directly to the user, the results index 108 allows the user to quickly review an entire multimedia file by focusing on the most important portions of the file, as designated by the user, instead of reviewing the entire file. The results index 108 also allows the user to view any video corresponding to an identified audio segment of interest, if the multimedia file analyzed by the feature extractor 106 is a video with accompanying audio.

Figure 2:
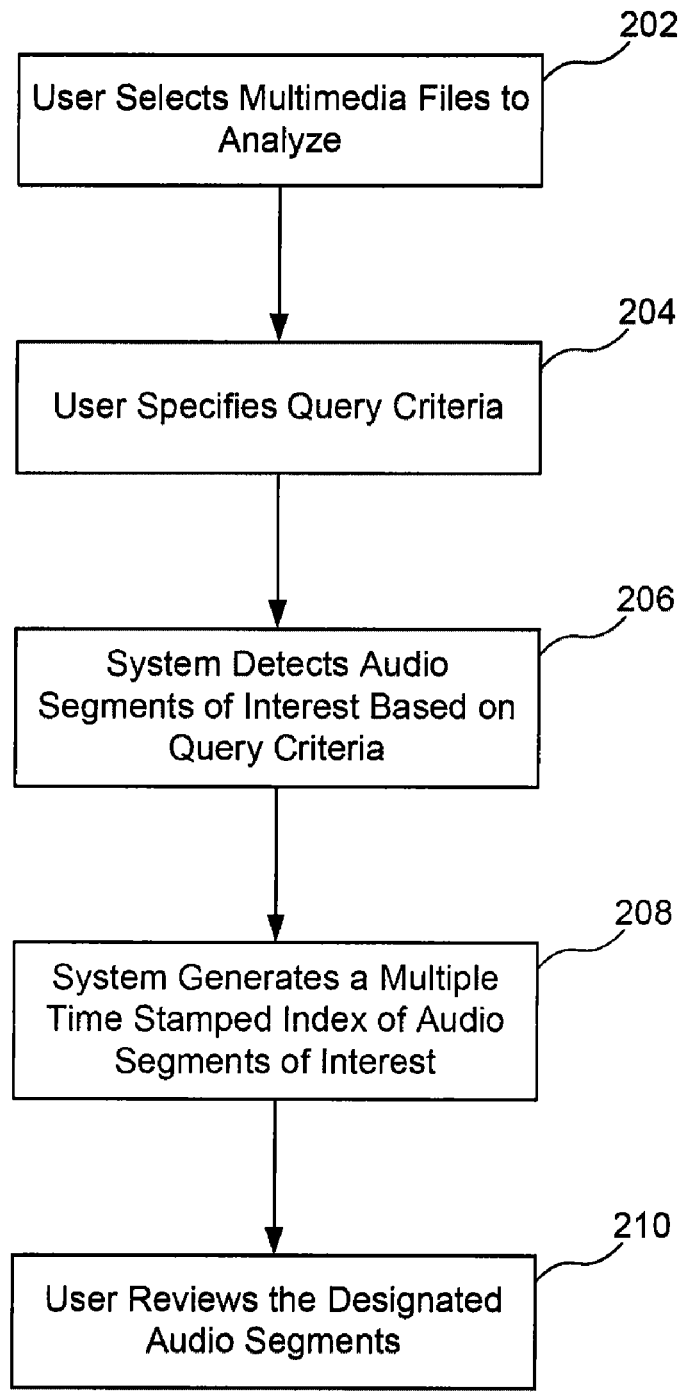
FIG. 2 shows a flowchart of an exemplary method of audio hot spotting.

FIG. 2 shows a method 200 of audio hot spotting, or rapid multimedia indexing and retrieval, by the audio hot spotting system 100. At step 202, the user selects a set of multimedia files to analyze. At step 204, the user specifies the query criteria. Specifically, the user designates audio features of interest to find in the multimedia files selected at step 202. Further, the user at step 204 can use introduce time and date limitations into the query as well as use Boolean logic to combine specified audio features of interest.

At step 206, the audio hot spotting system 100 retrieves the audio segments of interest based on the query criterion specified by the user at step 204. The audio hot spotting system 100 at step 206 locates the audio features of interest within the selected multimedia files and places temporal pointers in the multimedia files to flag audio segments of interest.

At step 208, the audio hot spotting system 100 generates a time stamped index of audio segments of interest. Specifically, the audio hot spotting system 100 at step 208 presents a listing of each audio feature of interest categorized by type and time of occurrence within the analyzed multimedia files.

At step 210, the user reviews the time stamped index generated at step 208. The user, at step 210, can now select and review each detected audio segment of interest. Specifically, at step 210, the user can select a link to audio segments of interest contained within the reviewed multimedia files as well as text transcripts. Method 200 allows the user of the audio hot spotting system 100 to quickly dissect (or filter) multiple multimedia files based on user-defined search criterion. By analyzing multimedia files according to lexical and non-lexical features, the audio hot spotting method 200 provides a robust process for rapidly indexing and retrieving audio segments of interest to reduce the examination time required of the user. The audio hot spotting method 200 enables an analyst to examine a multimedia file according to multiple audio features of interest to more accurately gauge context, contents and importance. Further, the audio hot spotting method 200 enables the analyst to review a large collection of files more quickly by allowing cross-file searches of lexical and non-lexical features of interest. That is, the audio hot spotting method 200 provides the ability to search for audio features of interest across multiple audio samples and/or multimedia files simultaneously.

The audio hot spotting system 100 can also provide automatic spoken keyword indexing. Automatic spoken keyword indexing provides a list of topic terms to the user for rapid assessment of a file's content and context. As automatic speech recognition is imperfect, automatic speech transcripts generated by ASR engines contain errors. The automatic spoken keyword indexing algorithm provided by the audio hot spotting system 100 focuses on finding words that are information rich (i.e., content words) and machine recognizable while filtering out words with little information value (e.g., prepositions or articles). The indexing algorithm is based on the principle that short duration and weakly stressed words contained within a multimedia file are more likely to be misrecognized and are less likely to be important than long duration words and strongly stressed words. Therefore, the indexing algorithm perceives strongly stressed words of long duration to be more important and consequently builds the keyword index based on strongly stressed words.

To eliminate words that are information-poor and prone to mis-recognition, the indexing algorithm examines the output of a speech recognizer and creates an index list of content words. The index-generation algorithm takes the following factors into consideration: (a) absolute word length by its utterance duration, (b) the number of syllables in a word, (c) the recognizer's own confidence score, and (d) the part of speech (i.e., verb, noun, etc.) using a Part of Speech (POS) tagger. In this manner, the index-generating algorithm is also capable of recognizing and discarding any words that do not contain any information value (for example, prepositions, articles, etc.). A POS tagger such as the one described in Brill, E., "Some Advances in Transformation-Based Part of Speech Tagging," Proceedings of the Twelfth National Conference on Artificial Intelligence (1994), incorporated by reference herein in its entirety, can be used to determine a word's part of speech.

The performance of the index-generating algorithm has been tested using broadcast news data, with Gaussian white noise added to achieve a desired Signal-to-Noise Ratio (SNR). Experiments indicate that the index list produced typically covers about 10% of the total words in the ASR output, while more than 90% of the indexed words are actually spoken and correctly recognized given a Word Error Rate (WER) of 30%. Table 1 below illustrates the performance of the automatic indexer as a function of SNR during a pilot study. In Table 1, Index Coverage is the fraction of the words in the transcript chosen as index words and IWER is the index word error rate.

TABLE 1

| SNR (db) | ASR WER (%) | Index Coverage (%) | IWER (%) |
|---|---|---|---|
| Orig. | 26.8 | 13.6 | 4.3 |
| 24 | 32.0 | 12.3 | 3.3 |
| 18 | 39.4 | 10.8 | 5.9 |
| 12 | 54.7 | 8.0 | 12.2 |
| 6 | 75.9 | 3.4 | 20.6 |
| 3 | 87.9 | 1.4 | 41.7 |

As expected, increases in WER result in fewer words meeting the criterion for the index list. However, the indexer algorithm still finds reliable words even in the presence of very noisy data. At 12 dB SNR, the recognizer WER increases to 54.7% while the Index Word Error Rate (IWER) increases to 12.2%. Note that an index-word error indicates that an index word chosen from the ASR output transcript did not in fact occur in the original reference transcription.

The index-generating algorithm that can be provided by the audio hot spotting system 100 allows the user to quickly obtain an understanding of the importance of a long audio conversation in just a few seconds by providing the user with automatically generated topic terms. By filtering out weakly stressed words, the index-generating algorithm enables the analyst to better and more quickly understand a multimedia file's context and contents. The usefulness of such an index list provided by the audio hot spotting system 100 will depend on the application.

The audio hot spotting system 100 can provide retrieval of user-specified keywords and keyphrases based upon one or more ASR engines but multiple engines that can include both word-based and phoneme-based recognition engines. Based on user-defined keywords and keyphrases, the audio hot spotting system 100 uses available word and phoneme-based engines to detect the occurrences of each keyword and keyphrase within each specified multimedia file. The audio hot spotting system 100 places a temporal pointer at each occurrence of a detected keyword or keyphrase. The placement of the temporal pointer allows the user to quickly retrieve a brief audio segment containing the detected keyword or keyphrase.

To measure performance, the audio hot spotting system 100 can consider a designated audio hot spot to be "correct" if the queried keyword or keyphrase actually exists in the audio at a time within half of the audio segment duration from the returned pointer. A response by the audio hot spotting system 100 can be considered a "missed detection" if the keyword or keyphrase exists in the audio but no temporal pointer within half of the audio segment duration is returned. Finally, a response can be considered a "false alarm" if the temporal pointer is too far away from an actual occurrence of the queried keyword or keyphrase in the audio or if the queried keyword or keyphrase does not exist in the audio segment at all.

For evaluation purposes during testing, the desired duration of a returned audio segment is set to six seconds, although the invention is not limited to this value. With this specified value, therefore, the keyword or keyphrase must exist in the audio within, e.g., +/−3 seconds of the returned temporal pointer to be considered a correct detection. To test the keyword and keyphrase retrieval capabilities of the audio hot spotting system 100, excerpts of selected audio files having various known word error rates were processed by a commercial word-based speech recognition engine with no tuning of the language or acoustic models for each file. The same files were also processed by a commercial phoneme-based recognition engine, also without any tuning. Three excerpts from the National Institute of Standards and Technology (NIST) meeting room data were used as test files. (excerpts 20020203, 20020314 and 20020627). Reference transcripts were then used to select information-bearing keywords and keyphrases as query terms. Tables 2 and 3, respectively, show two sets of keywords and keyphrases that were manually selected.

TABLE 2

| File: 20020627 | File: 20020214 | File: 20020304 |
|---|---|---|
| agonizing | computer | castle |
| backslashes | dsk | detail |
| computer | door | evil |
| debugging | help | healed |
| decorations | knobs | idea |
| Emily | move | king |
| function | office | kingdom |
| graffiti | officemate | love |
| InstallShield | paper | mother |
| Joe | problem | people |
| keyboard | room | prince |
| Linux | shelf | princess |

TABLE 2-continued

| File: 20020627 | File: 20020214 | File: 20020304 |
|---|---|---|
| meeting | space | queen |
| messages | survived | road |
| module | table | stepmother |
| onscreen | temperature | story |
| operate | vent | village |
| package | window | |
| Palm | | |
| PWS | | |
| remote | | |
| unpack | | |
| VIP | | |
| web | | |
| Wednesday | | |
| Windows | | |

TABLE 3

| File: 20020214 | File: 20020627 |
|---|---|
| air conditioner | having trouble |
| real problem | high priority |
| leg room | July seventeenth |
| plant division | onscreen keyboard |
| prime location | scrolling frame |
| control the temperature | successfully packaged |
| storage problem | |

| File: 20020304 |
|---|
| evil spell |
| wonderful deeds |

Figure 3:
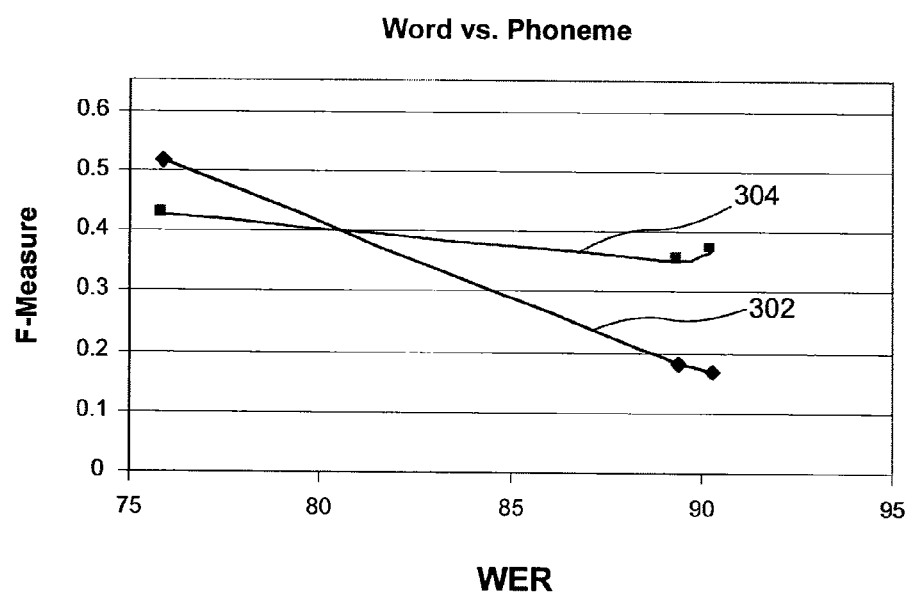
FIG. 3 shows a graph comparing performance of word-based and phoneme-based recognizers as a function of word error rate for three audio file excerpts.

Precision and recall are often the metrics chosen to evaluate keyword and keyphrase query performance. Precision indicates the percentage of returned audio pointers which actually identify audio segments containing the query term. Recall indicates the percentage of the total number of audio segments containing the query term which are actually identified by the returned audio pointers. F-measure, which is the harmonic mean of precision and recall, is also calculated for evaluation purposes. FIG. 3 provides a graph 300 of F-measure performance as a function of WER for the three audio file excerpts. FIG. 3 also compares keyword retrieval performance for a word-based recognizer, curve 302, and a phoneme-based recognizer, curve 304. As shown in FIG. 3, the phoneme-based recognizer outperforms the word-based recognizer at high word error rates while the word-based recognizer outperforms the phoneme-based recognizer at low word error rates.

Since the word-based recognizer makes a hard decision about each word in the transcript, searching for a particular keyword is very straightforward; the word is either present or not present in the audio file. When using the phoneme-based recognizer, the return for each query is a list of possible matches sorted by a confidence measure. Without some stopping criterion, the recognizer will return an endless list of possible matches resulting in excessive false alarms. Therefore, both fixed and relative confidence thresholds as well as a fixed number of false alarms for each keyword can be used as stopping criterion. Table 4 below compares keyword retrieval performance for word-based and phoneme-based recognizers where phoneme-based returns were ignored after a single false alarm for each keyword. In Table 4, Prec=Precision, Rec=Recall and F-M=F-Measure.

TABLE 4

| WER | Prec Word | Prec Phone | Rec Word | Rec Phone | F-M Word | F-M Phone |
|---|---|---|---|---|---|---|
| 90.3 | 1.00 | 0.438 | 0.091 | 0.318 | 0.167 | 0.368 |
| 89.4 | 0.83 | 0.381 | 0.102 | 0.327 | 0.182 | 0.352 |
| 75.9 | 0.85 | 0.500 | 0.370 | 0.369 | 0.516 | 0.425 |

Phrases can present a problem for a word-based recognizer. In a high WER domain, having all of the contiguous words in a phrase correctly recognized is difficult. Phoneme-based recovery detects an average of 75% of the phrases across the three tested WER conditions while the word-based recognizer found none. Therefore, in a high WER domain, detection of keyphrases by a phoneme-based recognizer may outperform a word-based recognizer.

The audio hot spotting system 100 is also capable of enabling the user to query and retrieve segments spoken by a particular speaker. The audio hot spotting system 100 achieves this capability by integrating and extending a research speaker identification algorithm discussed in Reynolds, D., "Speaker Identification and Verification Using Gaussian Mixture Speaker Models," Speech Communications, vol. 17, p. 91 (1995), incorporated by reference herein in its entirety.

Based on the speaker identification results, the audio hot spotting system 100 can automatically compute the number of times a speaker spoke and the total duration of the speaker's speech. Specifically, the audio hot spotting system 100 allows the user to retrieve three kinds of information. First, the user can retrieve content defined by the beginning and ending timestamps associated with a specified speaker, given that enough speech exists to build a model for that speaker. Second, the audio hot spotting system 100 can generate speaker participation statistics indicating how many times each speaker spoke and the total duration of each speaker's audio. Third, the audio hot spotting system 100 uses speaker identification to refine the query result by allowing the user to query keywords and speaker together. That is, the audio hot spotting system 100 can combine large-vocabulary, speaker-independent, continuous-speech recognition and speaker identification to refine lexical queries by a particular speaker. For example, the user can ask for incidents of the word "terrorism" spoken only by a particular speaker in a given multimedia file. This speaker extraction capability allows the audio hot spotting system 100 to provide another useful query parameter to the user.

The audio hot spotting system 100 can also allow the user to locate and retrieve changes in speech rate within a given multimedia file. For many commercial word recognizer systems, recognizer word error rates are highly correlated to speech rate. For the user, marking that a returned segment is from an abnormal speech rate segment and therefore more likely to contain errors allows the user to save time by ignoring these passages or reading them with discretion if desired. However, if passages of high stress are of interest, these are just the passages to be reviewed. For the recognizer, awareness of speech rate allows modification of Hidden Markov Model (HMM) state probabilities, and permits different sequences of phonemes.

To determine the speech rate accurately, the audio hot spotting system 100 can examine the phoneme-level output of the speech recognizer. Even though the phoneme-level error rate is high, the timing information is still valuable for rate estimation. By comparing the phoneme lengths of the recognizer output to phoneme lengths tabulated over many speakers, a rough estimate of speech rate is possible. This capability allows the audio hot spotting system 100 to provide another useful query parameter to the user.

The audio hot spotting system 100 can also allow the user to locate instances of laughter or applause. To locate occurrences of laughter or applause, the audio hot spotting system 100 employs an algorithm that uses a combination of several statistics, including the zero-crossing rate, a measure of amplitude histogram breadth, a measure of "voicedness," and overall bandwidth. The algorithms also use spectral information, as well as the estimated probability density function (pdf) of raw audio samples to determine if laughter or applause is present in an audio track.

Laughter has a spectral envelope that is similar to a vowel, but since many people are voicing at the same time, the audio has no coherence. On the other hand, the frequency spectrum of applause is much like noisy speech phonemes such as "sh" or "th." The pdf of applause, however, can differ from those individual sounds due to the presence of a number of high amplitude outlier samples. Applying this algorithm to the 2003 State of the Union address, all instances of applause were detected with only a 2.6% false alarm rate (results were compared with hand-labeled data). The ability to detect laughter or applause in an audio file enables the user to employ this non-lexical cue to identify statements that generate positive responses. This capability allows the audio hot spotting system 100 to provide another useful query parameter to the user.

The audio hot spotting system 100 can enable the user to specify vocal effort detection as query criterion. Vocal effort is the attribute of speech that allows a listener to perceive the continuum from a whisper to a scream. However, vocal effort is not simply loudness, but rather is a complex phenomenon correlated to shifts in pitch and changes in phonemic timing, as well as to changes in formant frequencies.

The vocal effort estimation algorithm used by the audio hot spotting system 100 is adapted from the algorithm discussed in Necioglu, B. et al., "Perceptual Relevance of Objectively Measured Descriptors for Speaker Characterization," Proceedings of ICASSP '96, pp. 483-486 (1996), incorporated by reference herein in its entirety. Vocal effort estimation is based on the spectral shape of an average glottal pulse computed over several seconds. Individual glottal pulses are found by performing linear predictive coding (LPC) analysis (using orders from 11-15), selecting the best order, and then performing inverse filtering to eliminate the effects of the vocal tract. In each 20 millisecond frame, a single best glottal pulse is found and included in an average.

Using the simulated portion of the Speech Under Simulated and Actual Stress (SUSAS) database and the Emotional Prosody (EP) database, vocal effort analysis determined that the bandwidth of the average pulse was indicative of vocal effort. The SUSAS and EP databases are discussed in Makhoul, J. et al., "Speech and Language Technologies for Audio Indexing and Retrieval," Proceedings of the IEEE, vol. 88, no. 8 (August 2000), incorporated by reference herein in its entirety, and Hansen, J. H. L., and S. E. Bou-Ghazale, "Getting started with SUSAS: A Speech Under Simulated and Actual Stress Database," EUROSPEECH-97, vol. 4, pp. 1743-1746, Rhodes, Greece (September 1997), incorporated by reference herein in its entirety. Therefore, vocal effort analysis revealed that the higher the bandwidth of the average pulse, the greater the vocal effort. For example, for the speech labeled "Loud" in the SUSAS database, the average upper bandwidth edge frequency is 470 Hz, with a standard deviation of approximately 50 Hz. For the speech labeled "Soft," the mean upper edge is 250 Hz, with a standard deviation of approximately 46 Hz.

Figure 4:
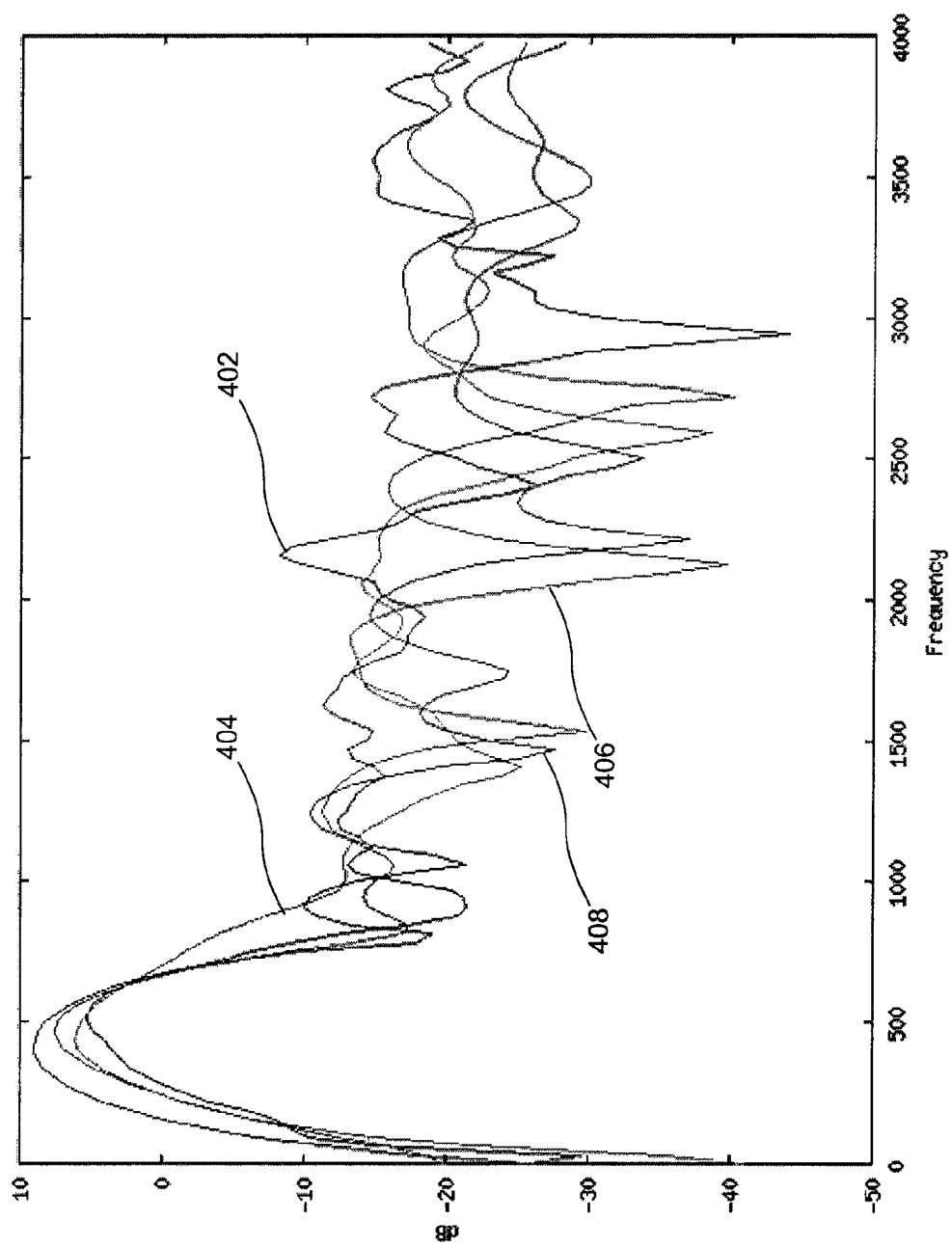
FIG. 4 shows glottal spectra of four high vocal effort samples from an audio file test database.
Figure 5:
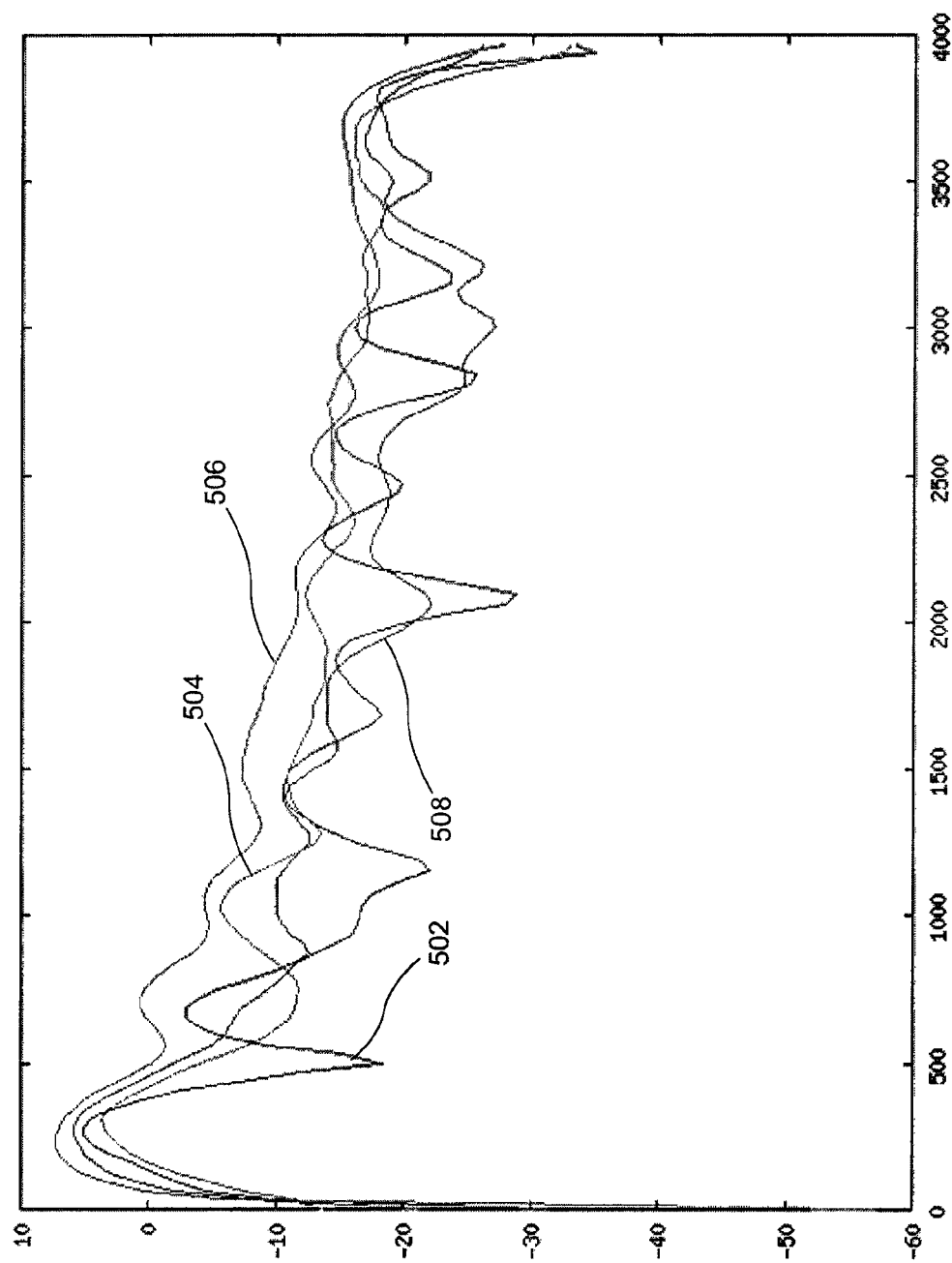
FIG. 5 shows glottal spectra of four low vocal effort samples from an audio file test database.

FIG. 4 provides a graph 400 of the glottal spectra of four EP high vocal effort samples including a first hot anger sample 402, a second hot anger sample 404, a first panic sample 406, and a second panic sample 408. FIG. 5 provides a graph 500 of the glottal spectra of four low vocal effort speech samples including a first passive sample 502, a second passive sample 506, a third passive sample 508, and a bored sample 504.

Based on these findings, the audio hot spotting system 100 can be adapted to detect changes in vocal effort in an audio file by examining average glottal pulse bandwidths. This capability allows the audio hot spotting system 100 to provide another useful query parameter to the user.

The audio hot spotting system 100 can also enable the user to specify speaker change detection as query criterion. Average glottal pulse, as similarly determined for vocal effort detection, can be used to also detect speaker change times. Note, however, that if a speaker has a sudden change in vocal effort, it will be seen as a speaker change. Thus, glottal pulse shape can be used as one of many factors, such as pitch statistics and average vocal tract length, employed in detecting speaker changes Experiments with broadcast news and corporate events reveal that the glottal pulse shape metric, $C\theta$, works well to detect speaker change events (approximately 80-90% proper detection rate). To detect speaker changes, the audio hot spotting system 100 can use 5 second analysis windows with a 1 second step. That is, a pulse can be created for seconds 1-5, then a pulse can be created for seconds 2-6, and so on. For more accurate speaker detection, windows over 3 seconds are better for meeting room audio. $C\theta$ is defined as:

$$C\theta = \sum \frac{gp_1[i] * gp_2[i + lag]}{\text{rms}(gp_1) * \text{rms}(gp_2)}$$

where $gp_1$ is the pulse shape prior to the possible change point, $gp_2$ is the pulse shape after the possible change point, lag represents the best cross-correlation offset, i represents the ith sample, rms represents root mean squared, and * denotes multiplication. The $C\theta$ can be helpful for situations involving formal speech styles and when applied to meetings in which people speak for much shorter durations with little variation in vocal effort. Nevertheless, this capability to determine $C\theta$ allows the audio hot spotting system 100 to provide another useful query parameter to the user.

The audio hot spotting system 100 can also provide semantic, morphological, and phonetic query expansion to improve audio retrieval performance. To do so, the audio hot spotting system 100 can integrate a text engine to expand a keyword query semantically, morphologically, and phonetically. As one example, the Oracle 9i text engine can be incorporated. For morphological expansion, a stemming function can be activated. For semantic expansion, keywords can be expanded to include hyponyms, hypernyms, synonyms, and semantically related terms. For example, a given user query for "oppose," can be expanded to include "anti," "antigovernment," "against," "opposed," and/or "opposition."

To address the noisy nature of speech transcripts, phonetic expansion can also be employed by the audio hot spotting system 100. Phonetic expansion can be particularly helpful for proper names. For example, if the proper name "Nesbit" is not in the given speech recognizer vocabulary, the word may not be correctly transcribed. In fact, the proper name "Nesbit" may be erroneously transcribed as "Nesbitt" with two "t"s. By phonetic expansion, "Nesbit" can be properly retrieved from the output of the automatic speech recognition engine.

The audio hot spotting system 100 can also provide translingual query expansion to improve audio retrieval performance. In some applications it can be helpful for the user to be able to query in a single language and to retrieve passages of interest from documents in several languages. The audio hot spotting system 100 can treat translingual search as another form of query expansion. The audio hot spotting system 100 can rely on a bilingual thesaurus by augmenting Oracle's default English thesaurus with Spanish dictionary terms. With this type of query expansion enabled, the audio hot spotting system 100 can retrieve passages that contain a user-specified keyword in either English or Spanish. A straightforward extension of this approach allows other languages to be supported.

CONCLUSION

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of searching for audio features within multimedia files, comprising:
    specifying one or more classes of audio sounds, each of the classes comprising acoustic characteristics of a range of sounds;
    searching an audio track of a multimedia file to detect occurrences of the classes; and
    retrieving at least a segment of the searched multimedia file, if the segment contains at least one occurrence of the classes.

2. A method of searching for audio features within multimedia files, comprising:
    specifying a query criterion that comprises one or more classes of audio sounds, each of the classes comprising acoustic characteristics of a range of sounds;
    querying an audio track of a multimedia file to detect occurrences of the classes; and
    retrieving at least a segment of the searched multimedia file, if the segment contains at least one occurrence of the classes.

3. The method of claim 2, wherein the classes include one of speech rate, laughter, applause, vocal effort, and speaker change.

4. The method of claim 2, wherein the specifying step further comprises specifying a duration of a retrieved segment.

5. The method of claim 2, further comprising providing, to a user, a list of detections of the query criterion within the file.

6. The method of claim 2, wherein the specifying step comprises specifying a query criterion comprising a lexical audio feature.

7. The method of claim 6, wherein the specifying step further comprises specifying a lexical audio feature comprising one of a user-specified phoneme string, a user-specified keyword, and a user-specified keyphrase.

8. The method of claim 6, further comprising combining the classes and the lexical audio feature using Boolean operators.

9. The method of claim 2, wherein the querying step comprises querying the audio track of the file to detect a phonetically expanded lexical audio feature.

10. The method of claim 2, wherein the querying step comprises querying an audio track of the file to detect a semantically expanded lexical audio feature.

11. The method of claim 2, wherein the querying step comprises querying an audio track of the file to detect a morphologically expanded lexical audio feature.

12. The method of claim 2, wherein the querying step comprises querying an audio track of the file to detect a translingually expanded lexical audio feature.

13. The method of claim 2, wherein the multimedia file is an audio file.

14. The method of claim 2, wherein the multimedia file is a video file.

15. The method of claim 2, wherein the multimedia file is any of WAV, AVI, MPEG, MPA, MP3 and MP4 file.

16. The method of claim 2, further comprising providing a user with a list of topic terms detected in the audio track of the file.

17. A system for searching for audio features within multimedia files, comprising:
 a user interface for specifying a query criterion comprising one or more classes of audio sounds, each of the classes comprising acoustic characteristics of a range of sounds; and
 an audio feature extractor that (i) queries an audio track of a multimedia file to detect occurrences of the classes (ii) retrieves at least a segment of the searched multimedia file, if the segment contains at least one occurrence of the classes.

18. The system of claim 17, wherein the classes include one of speech rate, laughter, applause, vocal effort, and speaker change.

19. The system of claim 17, wherein the query criterion further comprises a segment duration.

20. The system of claim 17, wherein the audio feature extractor provides, to a user, a list of detections of the query criterion within the file.

21. The system of claim 17, wherein the audio feature extractor further provides a cross-file detection of the query criterion.

22. The system of claim 17, wherein the query criterion further comprises a lexical audio feature.

23. The system of claim 22, wherein the lexical audio feature is one of a user-specified phoneme string, a user-specified keyword, and a user-specified keyphrase.

24. The system of claim 22, wherein the query criterion further comprises a combination of the classes and the lexical audio feature using Boolean operators.

25. The system of claim 22, wherein the lexical audio feature is phonetically expanded.

26. The system of claim 22, wherein the lexical audio feature is semantically expanded.

27. The system of claim 22, wherein the lexical audio feature is morphologically expanded.

28. The system of claim 22, wherein the lexical audio feature is translingually expanded.

29. The system of claim 17, wherein the multimedia file is an audio file.

30. The system of claim 17, wherein the multimedia file is a video file.

31. The system of claim 17, wherein the multimedia file is any of WAV, AVI, MPEG, MPA, MP3 and MP4 file.

32. The system of claim 17, wherein the audio feature extractor further provides a user with a list of topic terms detected in the audio track of the file.

* * * * *